United States Patent
Lee et al.

(10) Patent No.: US 8,423,772 B2
(45) Date of Patent: Apr. 16, 2013

(54) MULTI-HOP WIRELESS NETWORK SYSTEM AND AUTHENTICATION METHOD THEREOF

(75) Inventors: Yong Lee, Seoul (KR); Wook Choi, Hwaseong-si (KR); Hyo-Hyun Choi, Seoul (KR); Yong-Seok Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1532 days.

(21) Appl. No.: 11/987,796

(22) Filed: Dec. 4, 2007

(65) Prior Publication Data

US 2008/0162939 A1    Jul. 3, 2008

(30) Foreign Application Priority Data

Dec. 28, 2006    (KR) .................. 10-2006-0136767

(51) Int. Cl.
*H04L 29/06*    (2006.01)

(52) U.S. Cl.
USPC .......................................... 713/171; 380/270

(58) Field of Classification Search .................. None
See application file for complete search history.

(56) References Cited

U.S. PATENT DOCUMENTS

| | | |
|---|---|---|
| 2005/0152305 A1 | 7/2005 | Ji et al. |
| 2006/0126845 A1* | 6/2006 | Zheng ............................ 380/270 |
| 2006/0200678 A1 | 9/2006 | Yamada et al. |

FOREIGN PATENT DOCUMENTS

| | | |
|---|---|---|
| KR | 2003-0083941 | 11/2003 |
| KR | 2004-0054348 | 6/2004 |
| KR | 2005-0006418 | 1/2005 |
| KR | 10-2006-0094454 | 8/2006 |
| KR | 10-2006-0134069 | 12/2006 |
| WO | WO 2005/079036 | 8/2005 |

OTHER PUBLICATIONS

Rani Husseiki, "Distributed Authentication and Key Management in Wireless Mesh Nietworks", Master's Thesis, Department of Computer and system s sciences (DSV), Stockholm University, Royal Institute of technology (KTH), Stockholm, Sweden, Apr. 1, 2006, XP002507574.

Search Report issued on Jun. 23, 2009 in the European Patent Application No. 07016183.1.

Office Action from the Korean Intellectual Property Office issued in Applicant's corresponding Korean Patent Application No. 10-2006-0136767 dated Dec. 11, 2007.

Elsevier: I.F. Akyildiz et al. /Computer Networks 47 (2005), pp. 445-487, entitled *Wireless Mesh Networks: A Survey*, available online Jan. 1, 2005.

Cornell University: Zhou et al., entitled *Securing Ad Hoc Networks*, published in IEEE network, Nov./Dec. 1999.

Cornell University: Papadimitratos et al., entitled *Securing Mobile Ad Hoc Networks*, 2002.

(Continued)

*Primary Examiner* — Hadi Armouche
*Assistant Examiner* — Simon Kanaan
(74) *Attorney, Agent, or Firm* — H.C. Park & Associates, PLC (57) ABSTRACT

A multi-hop wireless network system and an authentication method thereof, wherein during initial mutual authentication between multi-hop nodes and a multi-hop wireless network, a shared key is acquired for hop-by-hop mutual authentication between the multi-hop nodes using a centralized authentication scheme. Using the acquired shared key, distributed authentication between the multi-hop nodes is performed.

14 Claims, 9 Drawing Sheets

OTHER PUBLICATIONS

University of California: Yang et al., Year 2004, Paper 618, pp. 38-47, entitled *Security in Mobile Ad Hoc Networks; Challenges and Solutions*, published on IEEE Wireless Communications in Feb. 2004.

IEEE P802.11s™/D0.01, entitled *Draft Amendment to Standard for Information Technology* . . . published in Mar. 2006.

06. Extensible Authentication Protocol RFC 3748: Aboba et al., entitled *Extensible Authentication Protocol (EAP)*, published in Jun. 2004.

Korean Decision of Grant issued on Mar. 31, 2008, corresponding to Korean Patent Application No. 2006-0136767.

* cited by examiner

MULTI-HOP WIRELESS NETWORK SYSTEM AND AUTHENTICATION METHOD THEREOF

CLAIM OF PRIORITY

This application makes reference to, incorporates the same herein, and claims all benefits accruing under 35 U.S.C. §119 from an application for MULTI-HOP WIRELESS NETWORK SYSTEM AND AUTHENTICATION METHOD THEREOF, earlier filed in the Korean Intellectual Property Office on 28 Dec. 2006 and there duly assigned Serial No. 2006-0136767.

BACKGROUND OF THE INVENTION

1. Field of the Invention

The present invention relates to a multi-hop wireless network system and an authentication method thereof.

2. Description of the Related Art

A multi-hop wireless network is a network into which an ad hoc network and an infrastructure-based network are integrated.

In the multi-hop wireless network, a portal such as a gateway is connected to a wired network, and multi-hop nodes are connected in a multi-hop structure. This multi-hop wireless network connects multi-hop nodes to a wireless link so as to facilitate a configuration of the network.

On the other hand, when a multi-hop node enters the multi-hop wireless network, mutual authentication with a base station (BS) or another multi-hop node should be performed to secure reliability.

When a mobile station (MS) accesses a multi-hop node, the presence of the multi-hop node should be transparent to the mobile station (MS) as when the mobile station (MS) directly accesses the base station (BS).

The multi-hop wireless network should be able to authenticate the mobile station (MS) in place of the base station (BS) even when a multi-hop node provides a function for establishing a call connection by performing a direct routing operation with another multi-hop node without going through the base station (BS).

The current authentication technology is developing into a distributed authentication scheme applied to an ad hoc network using an authentication protocol based on an encryption algorithm of a symmetric key, a public key, and the like and a centralized authentication scheme based on an authentication server (AS) in the Internet.

On the other hand, the multi-hop wireless network may apply the centralized authentication scheme in that a mobile portal (MP) can be connected to an infrastructure network. It can be seen that the multi-hop wireless network follows ad hoc network characteristics in that mutual authentication between multi-hop nodes should be performed.

The current authentication technique uses an identifier (ID)/password method, a shared secret based symmetric key algorithm, a public key based algorithm, and a challenge-response based algorithm.

In the multi-hop wireless network, multi-hop nodes exchange information required for a multi-hop wireless network configuration. Using this information, routing information is shared to perform multi-hop routing.

The multi-hop wireless network forwards data through the multi-hop nodes in a multi-hop scheme. When a rogue mobile portal (MP) is present while the data is forwarded, multi-hop formation may not be correctly performed and therefore wrong routing information may be delivered.

For this reason, the multi-hop node may not detect a target destination node and a rogue multi-hop node may not forward data along a route even when routing is performed. This problem may also occur in an ad hoc network or a wireless mesh network.

When a multi-hop node initially enters the multi-hop wireless network, initial authentication is required. Hop-by-hop authentication is required to continuously exchange control information with neighbor nodes.

Since the multi-hop nodes configure the ad hoc network without help of the infrastructure, the centralized authentication technique for performing an authentication process in the authentication server (AS) may not be used.

Accordingly, there is a problem in that mutual authentication should be performed for reliability between multi-hop nodes joining the ad hoc network.

Authentication techniques available in the ad hoc network are a technique in which nodes share a verification key required for certificate verification using a threshold cryptography method and a technique in which an authentication list is managed and shared by authenticating a correspondent node using a pretty good privacy (PGP) method whenever the nodes are on the move.

On the other hand, the Institute of Electrical and Electronics Engineers (IEEE) 802.11s standard defines that hop-by-hop authentication with neighbor mesh nodes in contact with mesh nodes should be performed to authenticate the mesh nodes.

In the wireless mesh network based on the IEEE 802.11s standard, the distributed authentication technique and the centralized authentication technique for mutual authentication between mesh nodes are as follows.

The centralized authentication is a scheme in which the authentication server (AS) performs authentication verification when a request for authenticating a correspondent node is sent in the case where authentication between mesh nodes is performed. Two mesh nodes joining an authentication procedure respectively serve as an authenticator to authenticate the correspondent node. Each mesh node serves as a supplicant to be authenticated by the correspondent node. On the other hand, the authentication server (AS) serving as proxy performs an authentication process and notifies the two mesh nodes of an authentication process result.

The distributed authentication is a scheme in which hop-by-hop authentication between mesh nodes is directly performed. To apply the distributed authentication, information required for authentication is shared in advance between the mesh nodes.

However, in the centralized authentication scheme, the multi-hop node should be constantly connected to the authentication server (AS). In this case, there is a problem in that heavy load may occur in the authentication server (AS) when mutual authentication between all nodes of the network is performed and an authentication procedure is time-consuming by causing a multi-hop node to access the authentication server (AS) at every time of authentication.

This centralized authentication scheme is not suitable for a multi-hop node since the multi-hop node should frequently perform authentication with many nodes in mobility and should process mobile station (MS) authentication between the mobile station (MS) and the base station (BS). There is a problem with transitive trust since authentication between multi-hop nodes relies on the authentication server (AS). Also, there is a problem in that an authentication delay occurs since the authentication server (AS) is accessed for authentication whenever a handoff occurs according to movement of a multi-hop node.

In the ad hoc network, secret information should be shared for authentication verification between multi-hop nodes. For this, a complex algorithm is used. Accordingly, there is a problem in that computational load occurs in the multi-hop nodes.

When the distributed authentication scheme is applied between nodes without an initial trust anchor, there is a problem with a rogue mobile terminal, an internal attack due to conspiracy of nodes inside the network, or scalability due to the increased number of nodes.

As described above, both the centralized authentication scheme and the distributed authentication scheme may be used in a multi-hop wireless network environment.

When only the centralized authentication scheme is applied to the multi-hop wireless network, there is a problem in that mutual authentication between multi-hop nodes relies on the authentication server (AS) and an authentication delay increases.

When only the distributed authentication scheme is applied to the multi-hop wireless network, there are problems with an operation for first sharing authentication verification information required for authentication between multi-hop nodes, an internal attack due to conspiracy of the multi-hop nodes, a rogue mobile portal (MP), and the like.

SUMMARY OF THE INVENTION

It is an object of the invention to provide a multi-hop wireless network system and an authentication method thereof that can acquire a shared key required for hop-by-hop mutual authentication between multi-hop nodes using a centralized authentication scheme in the case of first mutual authentication between multi-hop nodes and a multi-hop wireless network and can perform distributed authentication between the nodes using the acquired shared key.

According to an aspect of the present invention, a multi-hop wireless network system of the present invention including: an authentication server; and a multi-hop node for generating an authentication request message to join the multi-hop wireless network, sending the authentication request message to the authentication server through a base station, and generating a session key relating to the base station after generating an authorization key using a security key sent from the authentication server in response to the authentication request message.

Preferably, the authentication server authenticates the multi-hop node using one of an identifier/password method, a shared secret based symmetric key algorithm, a public key based algorithm, and a challenge-response based algorithm in response to the authentication request message sent from the multi-hop node.

According to another aspect of the invention, a multi-hop wireless network system of the present invention including: a base station; and first and second multi-hop nodes located in a service area of the base station, wherein the first multi-hop node sends an authentication request message to the second multi-hop node for mutual authentication with the second multi-hop node, and the second multi-hop node provides the first multi-hop node with an authorization key of the first multi-hop node included in an authorization key response message received from one of the base station and the neighbor multi-hop nodes after broadcasting an authorization key request message to the base station and the neighbor multi-hop nodes so as to acquire the authorization key of the first multi-hop node upon receiving the authentication request message.

Preferably, the one of the base station and the neighbor multi-hop nodes sends the authorization key response message in which the authorization key of the first multi-hop node is encrypted with a session key relating to the second multi-hop node.

Preferably, the first and second multi-hop nodes mutually generate a new authorization key by refreshing the authorization key of the first multi-hop node.

According to another aspect of the invention, a multi-hop wireless network system of the present invention including: an authentication server; a base station; and multi-hop nodes located in a service area of the base station, wherein a multi-hop node sends the authentication request message received from another multi-hop node to the authentication server through the base station so as to join the multi-hop wireless network system, and generates a session key relating to the other multi-hop node to send the session key to the other multi-hop node after generating an authorization key using a security key sent from the authentication server in response to the authentication request message.

Preferably, the multi-hop wireless network system further includes: a first multi-hop node, located in the area of the base station, for broadcasting an authorization key message to neighbor nodes of the first multi-hop node so as to acquire authorization key information required for mutual authentication with the other multi-hop node upon receiving an authentication request message from the other multi-hop node, and providing the other multi-hop node with an authorization key included in an authorization key response message received from one of the neighbor nodes.

Preferably, the one of the neighbor nodes encrypts the authorization key to be included in the authorization key response message using a session key relating to the first multi-hop node and sends the encrypted authorization key to the first multi-hop node.

Preferably, the other multi-hop node and the first multi-hop node mutually generate a new authorization key by refreshing the authorization key included in the authorization key response message.

According to another aspect of the invention, a multi-hop wireless network system of the invention including: an authentication server; and a multi-hop node for sending an authentication request message received from a mobile station to the authentication server through a base station so as to join a multi-hop wireless network, and generating a session key relating to the mobile station after generating an authorization key using a security key sent from the authentication server in response to the authentication request message.

According to another aspect of the invention, a multi-hop wireless network system of the present invention including: first and second multi-hop nodes, wherein the first multi-hop node sends a mutual authentication request to the second multi-hop node when a handoff to a service area of the second multi-hop node is performed, and the second multi-hop node sends a request for an authorization key for the first multi-hop node to neighbor nodes of the second multi-hop node and performs mutual authentication using the authorization key for the first multi-hop node received from one of the neighbor nodes.

Preferably, the one of the neighbor nodes encrypts the authorization key using a session key relating to the second multi-hop node and sends the encrypted authorization key to the second multi-hop node.

According to another aspect of the invention, a multi-hop wireless network system of the invention including: first and second multi-hop nodes, wherein the second multi-hop node sends a request for an authorization key required to authenticate the first multi-hop node to neighbor nodes of the second multi-hop node after receiving handoff information from a node in contact with the first multi-hop node before the first multi-hop node enters a service area of the second multi-hop node, and performs mutual authentication using the authorization key for the first multi-hop node received from one of the neighbor nodes.

Preferably, one of the neighbor nodes encrypts the authorization key using a session key relating to the second multi-hop node and sends the encrypted authorization key to the second multi-hop node.

According to another aspect of the invention, an authentication method for use in a multi-hop wireless network system having an authentication server and multi-hop nodes, includes steps of: generating, by a multi-hop node, an authentication request message to join a multi-hop wireless network and sending the authentication request message to the authentication server through a base station; generating, by the authentication server, a security key after authenticating the multi-hop node in a set algorithm in response to the authentication request message and sending the security key to the multi-hop node; and generating, by the multi-hop node, a session key relating to the base station after generating an authorization key using the security key sent from the authentication server.

According to another aspect of the invention, an authentication method for use in a multi-hop wireless network system having a base station and first and second multi-hop nodes located in a service area of the base station, includes steps of: providing, by the first multi-hop node, the second multi-hop node with an authentication request message for mutual authentication with the second multi-hop node; and providing, by the second multi-hop node, the first multi-hop node with an authorization key of the first multi-hop node included in an authorization key response message received from one of the base station and the neighbor multi-hop nodes after broadcasting an authorization key request message to the base station and the neighbor multi-hop nodes so as to acquire the authorization key of the first multi-hop node upon receiving the authentication request message.

Preferably, providing the first multi-hop node with the authorization key of the first multi-hop node includes: sending, by the one of the base station and the neighbor multi-hop nodes, the authorization key response message in which the authorization key of the first multi-hop node is encrypted with a session key relating to the second multi-hop node.

Preferably, the authentication method further includes: mutually generating, by the first and second multi-hop nodes, a new authorization key by refreshing the authorization key of the first multi-hop node.

According to another aspect of the invention, an authentication method for use in a multi-hop wireless network system having an authentication server, a base station, and multi-hop nodes located in a service area of the base station, includes steps of: sending, by a multi-hop node, an authentication request message received from another multi-hop node to the authentication server through the base station so as to join the multi-hop wireless network system; generating, by the authentication server, a security key to send the security key to the multi-hop node through the base station after authenticating the multi-hop node in a set algorithm in response to the authentication request message; and generating, by the multi-hop node, a session key relating to the other multi-hop node to send the session key to the other multi-hop node after generating an authorization key using the security key sent from the authentication server.

Preferably, the authentication method further includes: broadcasting, by a first multi-hop node located in the area of the base station, an authorization key message to neighbor nodes of the first multi-hop node so as to acquire authorization key information required for mutual authentication with the other multi-hop node upon receiving an authentication request message from the other multi-hop node, and providing the other multi-hop node with an authorization key included in an authorization key response message received from one of the neighbor nodes.

Preferably, providing the other multi-hop node with the authorization key included in the authorization key response message received from the one of the neighbor nodes includes: encrypting, by the one of the neighbor nodes, the authorization key to be included in the authorization key response message using a session key relating to the first multi-hop node and sending the encrypted authorization key to the first multi-hop node.

Preferably, the authentication method further includes: mutually generating, by the other multi-hop node and the first multi-hop node, a new authorization key by refreshing the authorization key included in the authorization key response message.

According to another aspect of the invention, an authentication method for use in a multi-hop wireless network system having an authentication server and multi-hop nodes, includes steps of: sending, by a multi-hop node, an authentication request message received from a mobile station to the authentication server through a base station so as to join a multi-hop wireless network; generating, by the authentication server, a security key to send the security key to the multi-hop node through the base station after authenticating the multi-hop node in a set algorithm in response to the authentication request message; and generating, by the multi-hop node, a session key relating to the mobile station after generating an authorization key using the security key sent from the authentication server.

According to another aspect of the invention, an authentication method for use in a multi-hop wireless network system, includes steps of: sending, by a first multi-hop node, a mutual authentication request to a second multi-hop node when a handoff to a service area of the second multi-hop node is performed; and sending, by a second multi-hop node, a request for an authorization key for the first multi-hop node to neighbor nodes of the second multi-hop node and performing mutual authentication using the authorization key for the first multi-hop node received from one of the neighbor nodes.

Preferably, performing the mutual authentication using the authorization key for the first multi-hop node received from the one of the neighbor nodes of the second multi-hop node includes: encrypting, by the one of the neighbor nodes, the authorization key using a session key relating to the second multi-hop node to send the encrypted authorization key to the second multi-hop node.

According to another aspect of the invention, an authentication method for use in a multi-hop wireless network system, includes steps of: sending, by a second multi-hop node, a request for an authorization key required to authenticate a first multi-hop node to neighbor nodes of the second multi-hop node after receiving handoff information from a node in contact with the first multi-hop node before the first multi-hop node enters a service area of the second multi-hop node; encrypting, by one of the neighbor nodes, the authorization key to send the encrypted key to the second multi-hop node; and performing, by the second multi-hop node, mutual authentication with the first multi-hop node using the authorization key for the first multi-hop node.

Preferably, encrypting, by the one of the neighbor nodes, the authorization key to send the encrypted key to the second multi-hop node includes: encrypting, by the one of the neighbor nodes, the authorization key using a session key relating to the second multi-hop node to send the encrypted authorization key to the second multi-hop node.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The invention will now be described more fully hereinafter with reference to the accompanying drawings, in which preferred embodiments of a multi-hop wireless network system and an authentication method thereof in accordance with the invention are shown.

Figure 1:
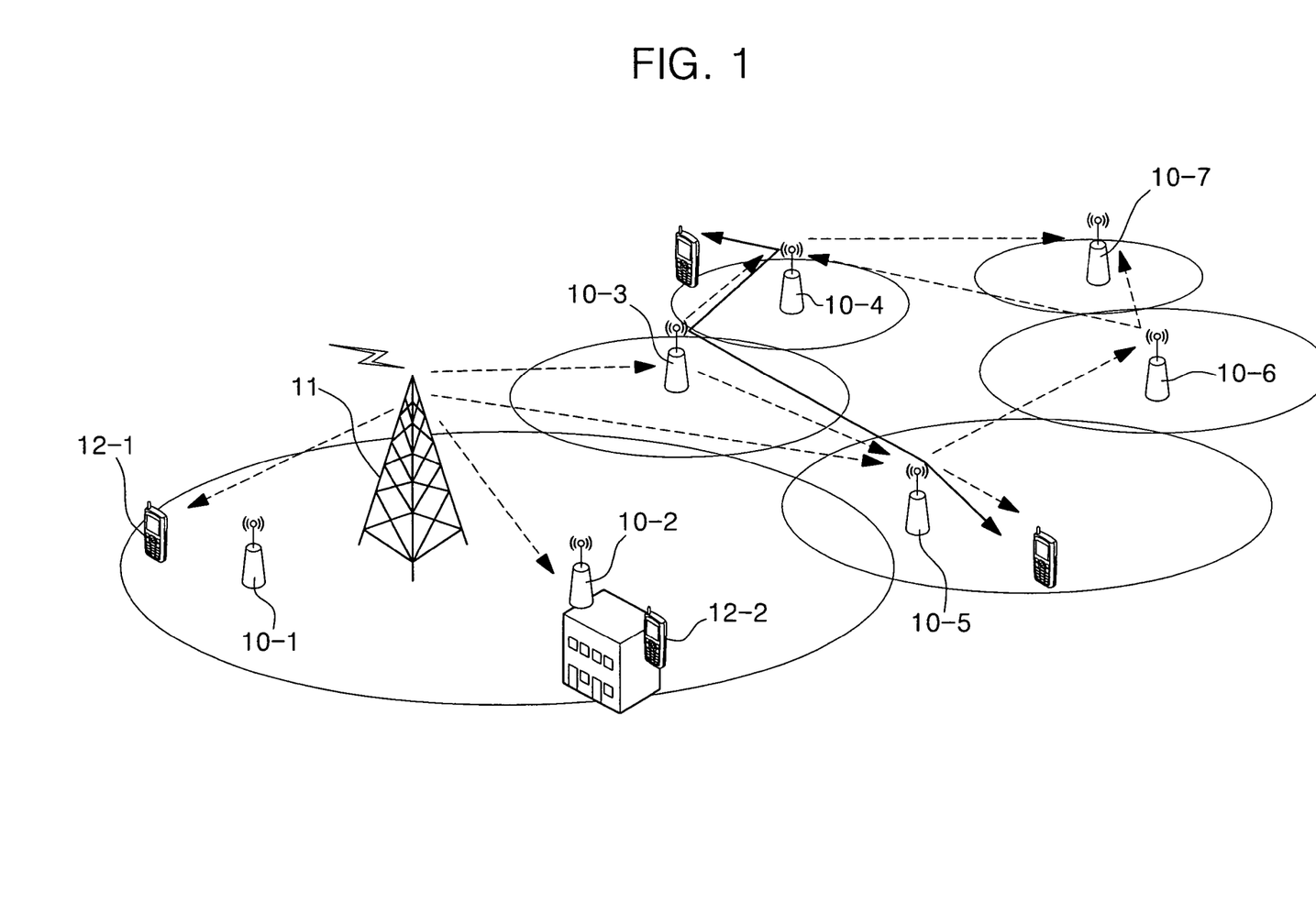
FIG. 1 illustrates a configuration of a multi-hop wireless network system in accordance with the invention.

FIG. 1 illustrates a configuration of a multi-hop wireless network system in accordance with the invention.

As shown in FIG. 1, multi-hop nodes 10-1, 10-2, 10-3, 10-4, 10-5, 10-6 and 10-7 are connected to each other in a multi-hop scheme to configure a multi-hop wireless network.

For example, multi-hop nodes 10-1 and 10-2 are connected to each other by multiple hops from a base station (BS) 11.

On the other hand, mobile station (MS)s 12-1 and 12-2 can be directly connected through the multi-hop nodes 10-1 and 10-2 without going through the base station (BS) 11.

In this case, the mobile stations 12-1 and 12-2 are directly authenticated by the multi-hop nodes 10-1 and 10-2.

When intending to join the multi-hop wireless network, the multi-hop nodes 10-1 and 10-2 verify whether their multi-hop wireless network is a lawful network.

In the multi-hop wireless network system, it is verified whether a newly joined multi-hop node is a lawful node.

For this, the multi-hop nodes 10-1 and 10-2 perform a mutual authentication procedure between the nodes and the multi-hop wireless network through mutual authentication with an authentication server (AS) (not shown). Using shared key information acquired through the mutual authentication procedure, mutual authentication between neighbor nodes is performed.

In other words, when the multi-hop nodes 10-1 and 10-2 desire to join the multi-hop wireless network, an initial authentication request is sent to a neighbor node selected by a proper algorithm.

At this time, the neighbor node selected by the proper algorithm can be one of a first detected multi-hop node, a multi-hop node having the highest signal strength, and a multi-hop node interworking with the base station (BS).

The selected authentication node (or neighbor node) should previously join the multi-hop wireless network and a multi-hop node having an authentication server function or a multi-hop node connected to the authentication server (AS) should be detected.

Accordingly, the neighbor node sends an initial authentication request of a new multi-hop node to the multi-hop node having the authentication server function through a secure connection in the multi-hop wireless network.

Hereinafter, an initial authentication process to be performed, when the neighbor node is a relay station (RS) (or multi-hop node) interworking with the base station (BS), will be described with reference to FIG. 2.

Figure 2:
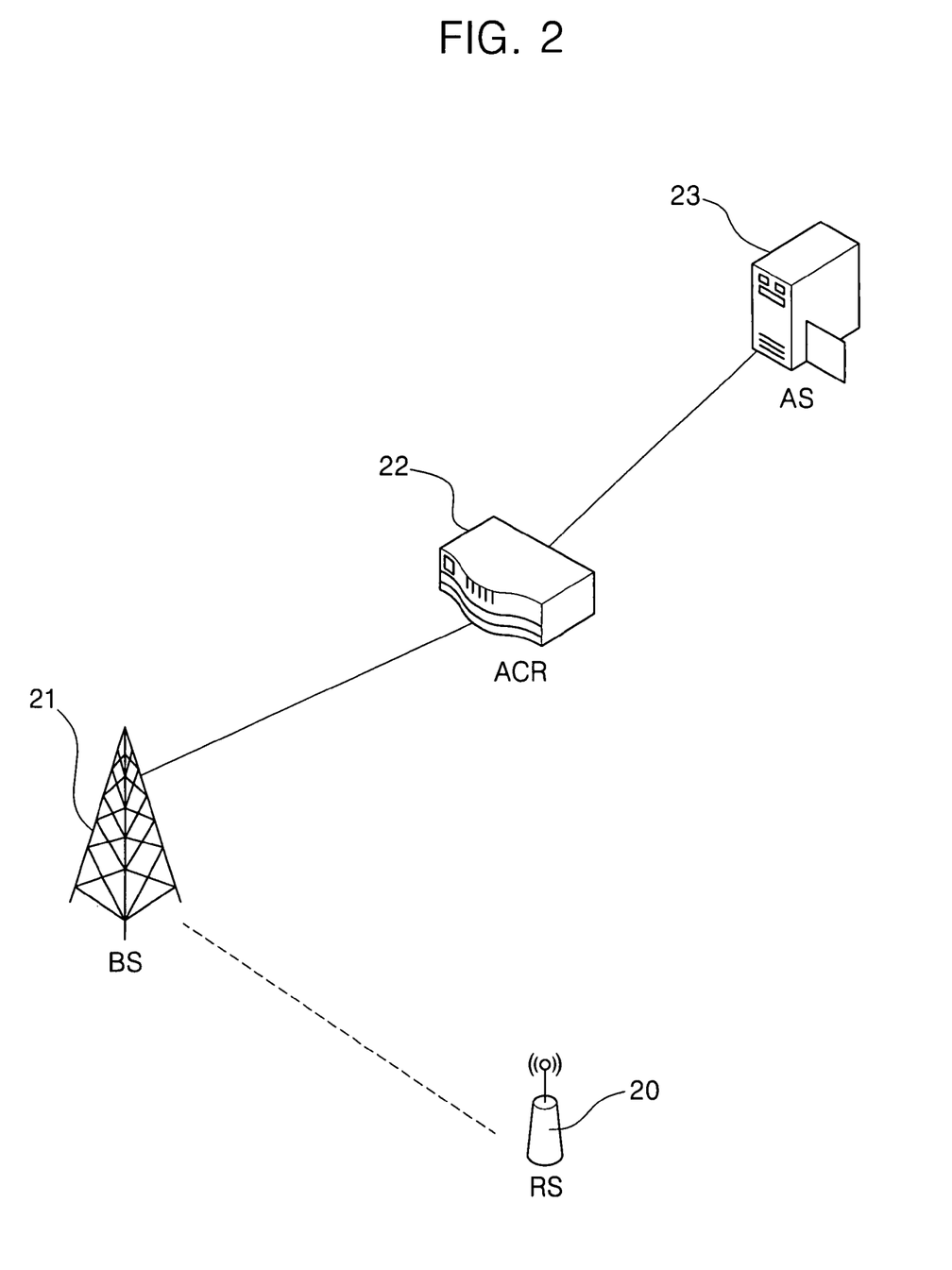
FIG. 2 illustrates a process flow of authenticating a multi-hop node when the multi-hop node initially enters a Worldwide Interoperability for Microwave Access (WiMAX) network.

FIG. 2 illustrates a process flow of authenticating a multi-hop node when the multi-hop node initially enters a WiMAX network.

As shown in FIG. 2, a multi-hop node 20 sends an authentication request to an authentication server (AS) 23 through a base station (BS) 21 when intending to join the WiMAX network.

The authentication server (AS) 23 performs mutual authentication with the multi-hop node 20 in response to the initial authentication request of the multi-hop node 20.

At this time, an available authentication algorithm can be one of an ID/password method, a shared secret based symmetric key algorithm, a public key based algorithm, and a challenge-response based algorithm.

When the mutual authentication between the authentication server (AS) 23 and the multi-hop node 20 is completed and the multi-hop node 20 is credential, the authentication server (AS) 23 generates a pair-wise master key (PMK) to send the pair-wise master key to an access control router (ACR) 22 and the multi-hop node 20.

The access control router 22 and the multi-hop node 20 generate an authorization key (AK) from the pair-wise master key sent by the authentication server (AS) 23. The base station (BS) 21 and the multi-hop nodes 20 perform mutual authentication using the generated authorization key to share a session key (or traffic encryption key (TEK)).

Figure 3:
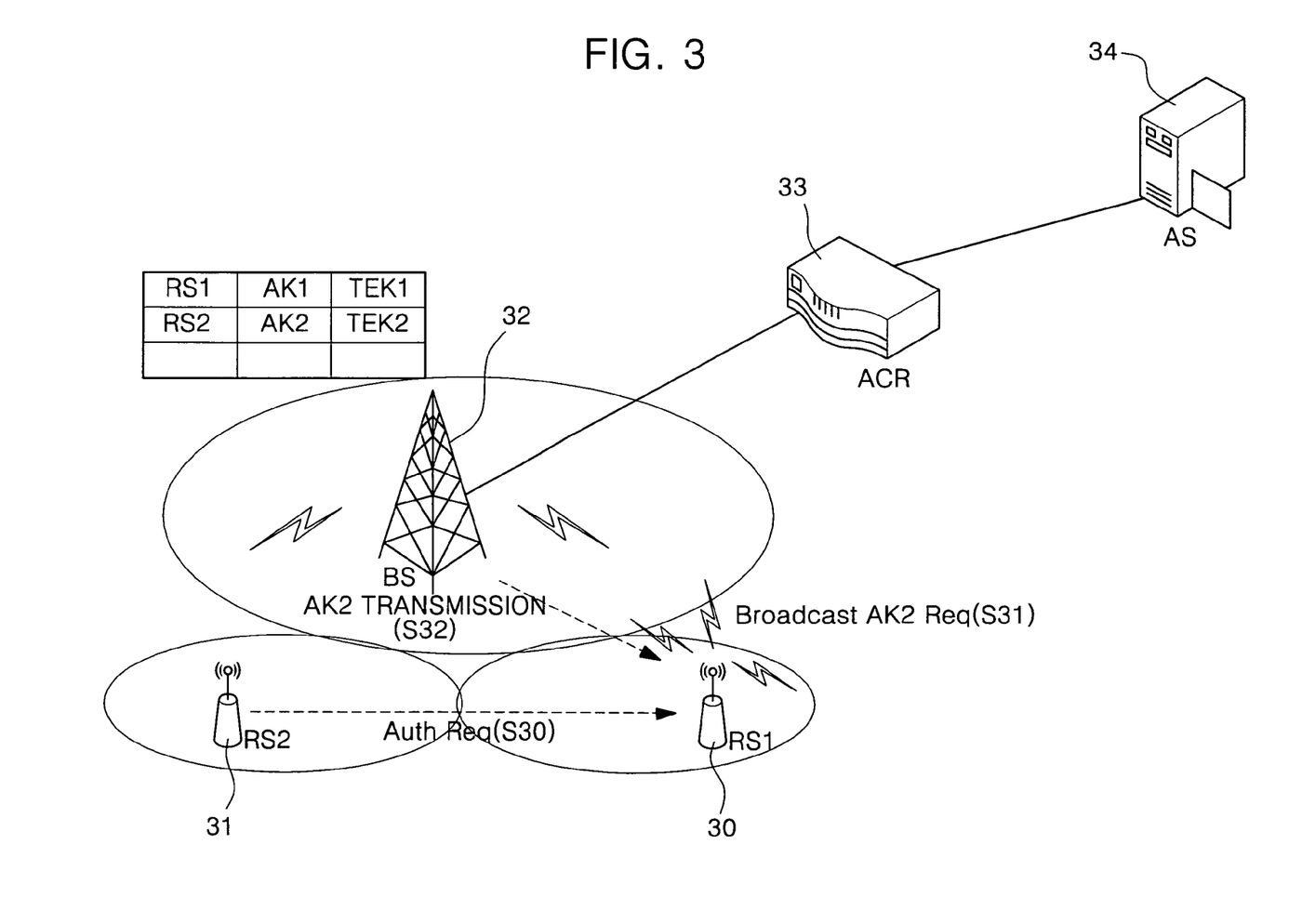
FIG. 3 illustrates a process flow of acquiring an authorization key when distributed authentication between multi-hop nodes is performed.

FIG. 3 illustrates a process flow of acquiring an authorization key when distributed authentication between multi-hop nodes is performed.

As shown in FIG. 3, when a multi-hop node 30 and a multi-hop node 31 perform an initial authentication procedure through a base station (BS) 32, the base station 32 has authorization keys AK1 and AK2 for the multi-hop nodes 30 and 31.

The multi-hop node 31 sends an authentication request message Auth Req to the multi-hop node 30 so as to perform distributed authentication with the multi-hop node 30 (S30).

Upon receiving the authentication request message from the multi-hop node 31, the multi-hop node 30 broadcasts a message for requesting an authorization key of the multi-hop node 31 to the base station 32 and a neighbor multi-hop node so as to detect authorization key information of the multi-hop node 31 (S31).

In response to the message for requesting the authorization key of the multi-hop node 31 broadcast from the multi-hop node 30, the base station 32 provides the multi-hop node 31 with an authorization key response message including the authorization key AK2 of the multi-hop node 31 (S32).

At this time, it is preferable that the base station 32 encrypts and sends the authorization key AK2 of the multi-hop node 31 using a session key TEK1 between the base station 32 and the multi-hop node 30.

Accordingly, the multi-hop nodes 30 and 31 share the authorization key required to perform the distributed authentication.

The multi-hop node 30 can acquire the authorization key AK2 of the multi-hop node 31 using a method for acquiring the authorization key AK2 of the multi-hop node 31 by encrypting the entire authorization key from one base station (BS) or multi-hop node (or relay station (RS)) at one time and a method (for example, threshold cryptography) for acquiring the authorization key AK2 of the multi-hop node 31 by receiving information required to generate the authorization key AK2 of the multi-hop node 31.

Figure 4:
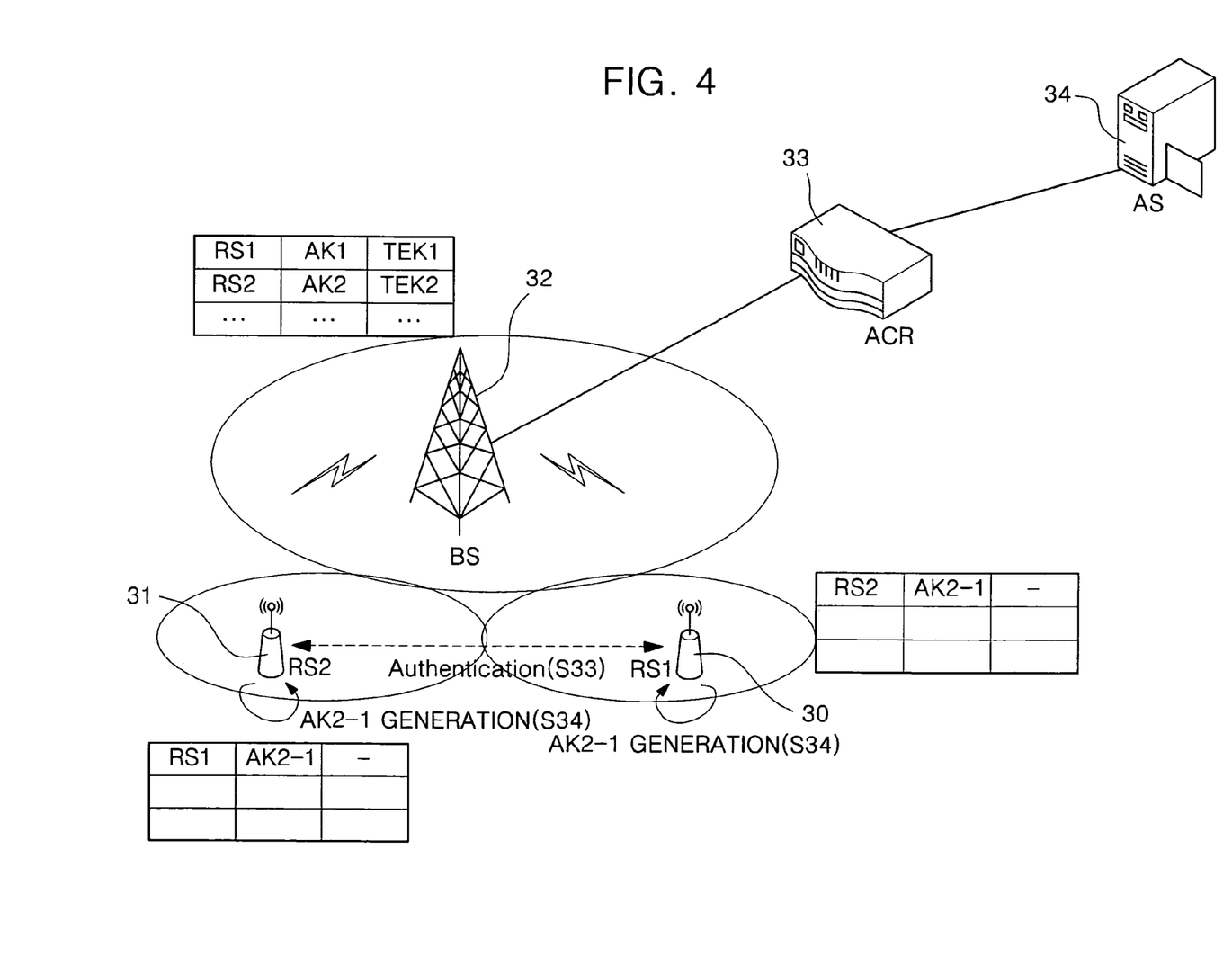
FIG. 4 illustrates a process flow of generating a new authorization key using the authorization key based on the distributed authentication between the multi-hop nodes shown in FIG. 3.

On the other hand, the multi-hop nodes 30 and 31 mutually perform the distributed authentication procedure using the authorization key AK2 (S33; FIG. 4). Alternatively, the multi-hop nodes 30 and 31 can generate an authorization key AK2-1 to share an independent authorization key separated from the authorization key AK2. This will be described with reference to FIG. 4.

As shown in FIG. 4, the multi-hop nodes 30 and 31 generate a new authorization key AK2-1 by refreshing the authorization key AK2 (S34).

Figure 5:
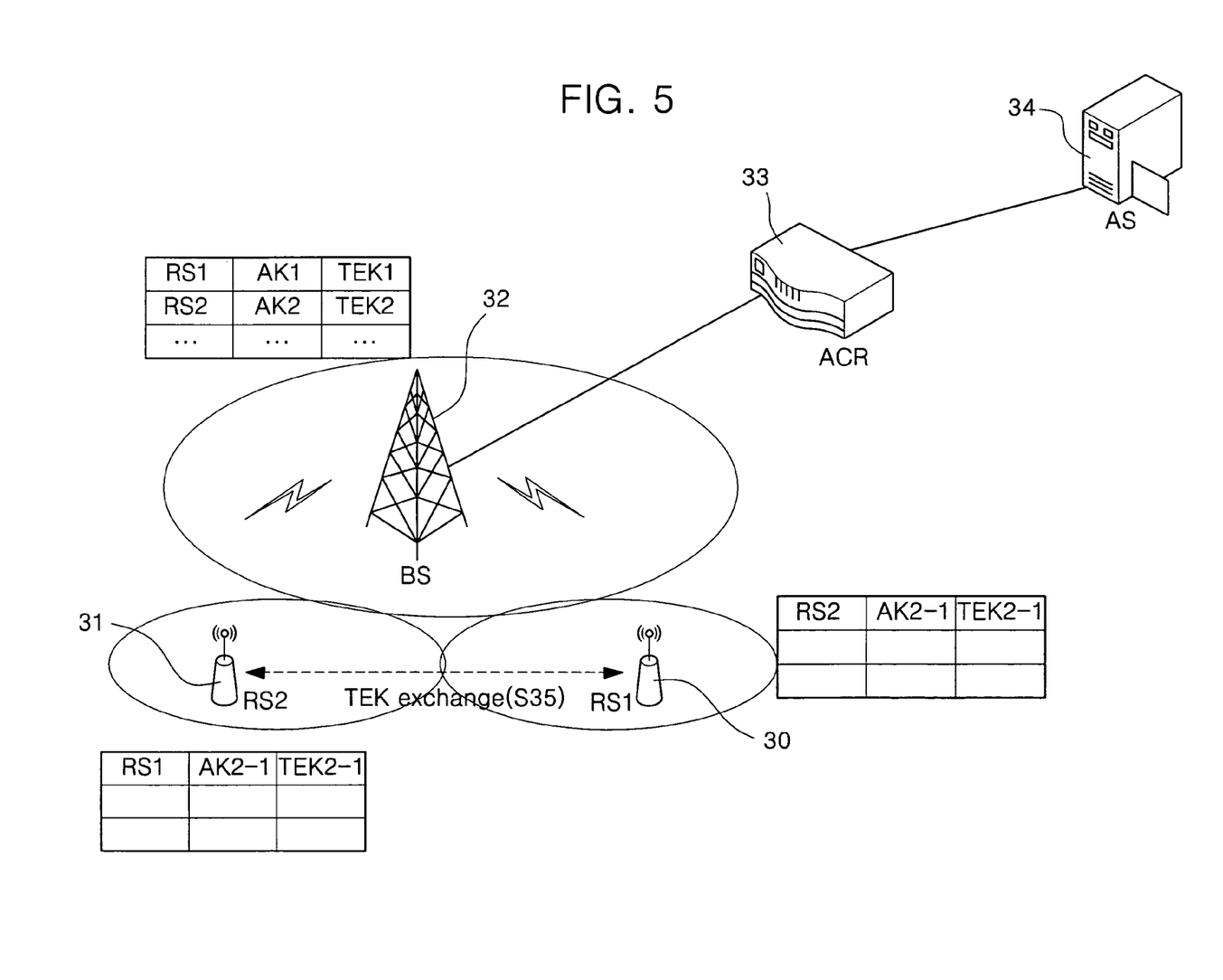
FIG. 5 illustrates a process flow of generating a session key after the distributed authentication between the multi-hop nodes shown in FIG. 3.

After the multi-hop nodes 30 and 31 perform a mutual authentication procedure, a session key TEK2-1 is shared between tables as shown in FIG. 5 (S35).

Figure 6:
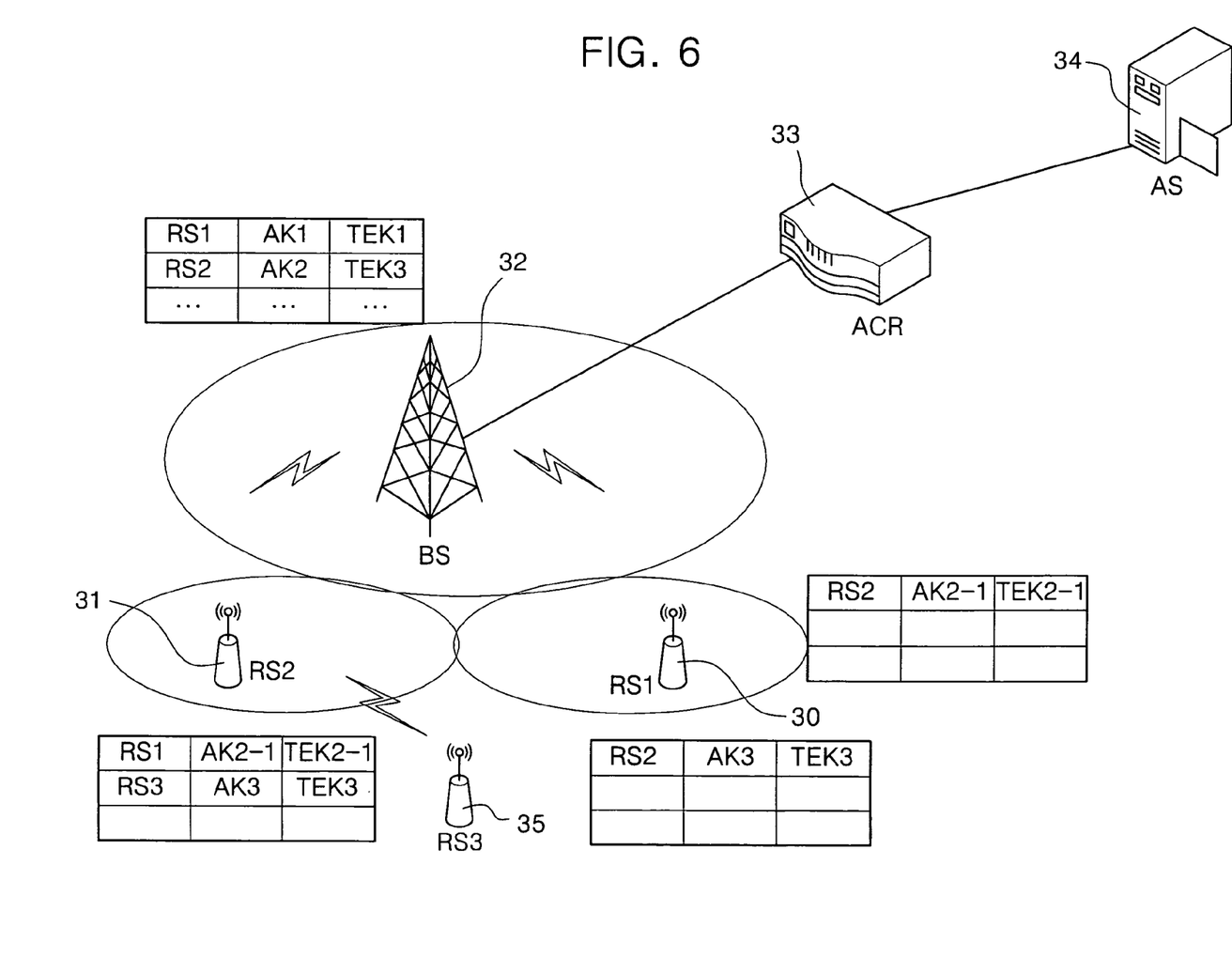
FIG. 6 illustrates an authentication process flow when a multi-hop node joins a multi-hop wireless network through another multi-hop node.

FIG. 6 illustrates an authentication process flow when a multi-hop node joins a multi-hop wireless network through another multi-hop node.

As shown in FIG. 6, a multi-hop node 35 sends an authentication request message Auth Req to an authentication server (AS) 34 through a multi-hop node 31 to join the multi-hop wireless network.

In response to the authentication request message sent from the multi-hop node 35, the authentication server (AS) 34 authenticates the multi-hop node 35 to generate a pair-wise master key and then sends the pair-wise master key to the multi-hop nodes 31 and 35 through an access control router 33 and a base station 32.

The multi-hop nodes 31 and 35 perform a distributed authentication procedure after mutually generating an authorization key AK3 using the pair-wise master key.

The multi-hop nodes 31 and 35 share a session key TEK3 after performing a mutual authentication procedure.

Figure 7:
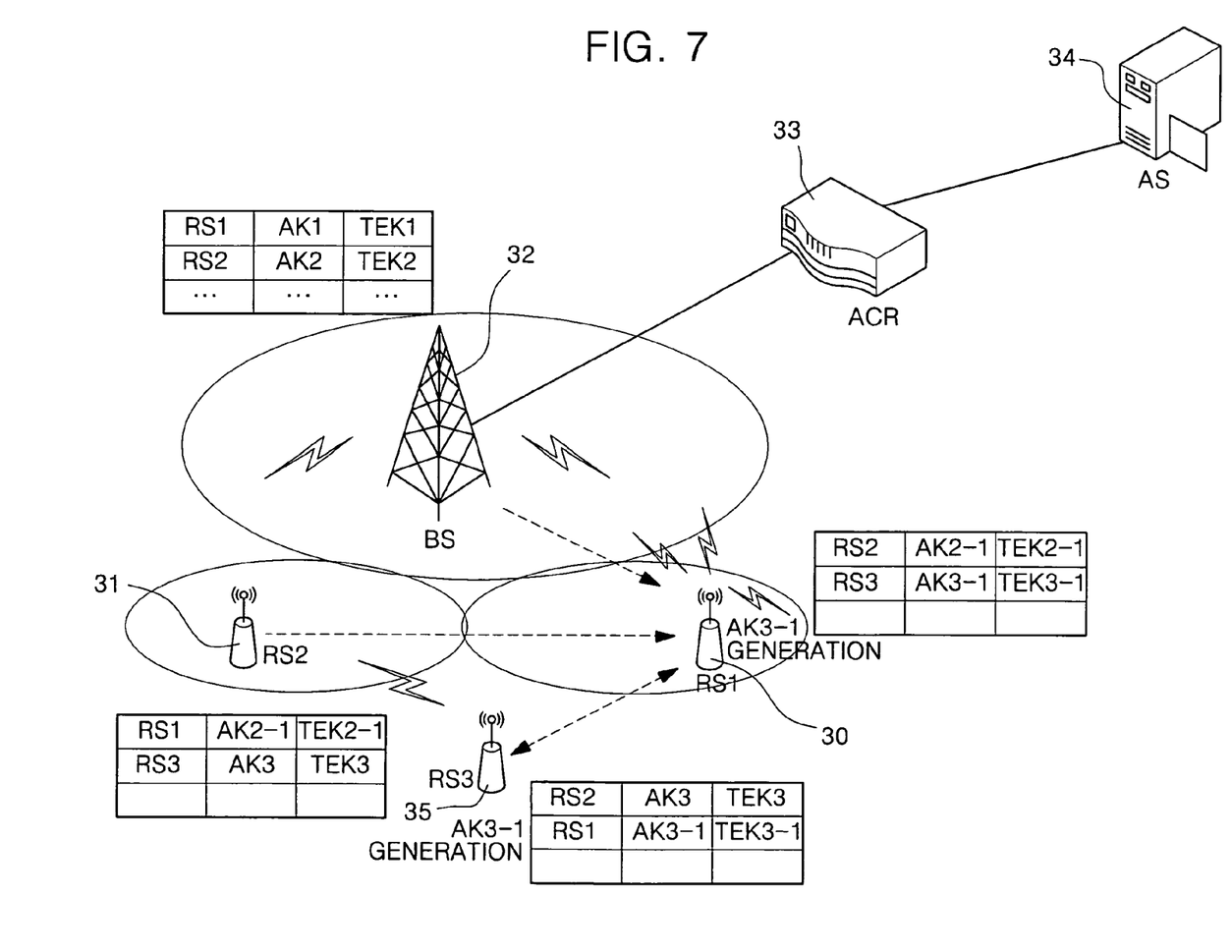
FIG. 7 illustrates a process flow of performing hop-by-hop authentication with neighbor nodes using distributed authentication after mutual authentication when a multi-hop node enters the network using centralized authentication.

FIG. 7 illustrates a process flow of performing hop-by-hop authentication with neighbor nodes using distributed authentication after mutual authentication when a multi-hop node enters the network using centralized authentication.

As shown in FIG. 7, a multi-hop node 35 sends an authentication request message Auth Req to perform mutual authentication with a multi-hop node 30 serving as a neighbor node.

Upon receiving the authentication request message from the multi-hop node 35, the multi-hop node 30 broadcasts an authorization key request message to its neighbor nodes so as to acquire authorization key information required to authenticate the multi-hop node 35.

Among the neighbor nodes of the multi-hop node 30, a multi-hop node 31 includes an authorization key AK3 required to authenticate the multi-hop node 35 in an authorization key response message in response to the broadcast authorization key request message and then sends the authorization key response message to the multi-hop node 30.

At this time, it is preferable that the multi-hop node 31 encrypts and sends the authorization key AK3 required to authenticate the multi-hop node 35 using a session key TEK2-1 shared with the multi-hop node 30.

The multi-hop node 30 authenticates the multi-hop node 35 using the authorization key AK3 and then generates a session key TEK3-1 to send the session key TEK3-1 to the multi-hop node 35.

On the other hand, the multi-hop nodes 30 and 35 refresh the authorization key AK3 to generate a new authorization key AK3-1.

Figure 8:
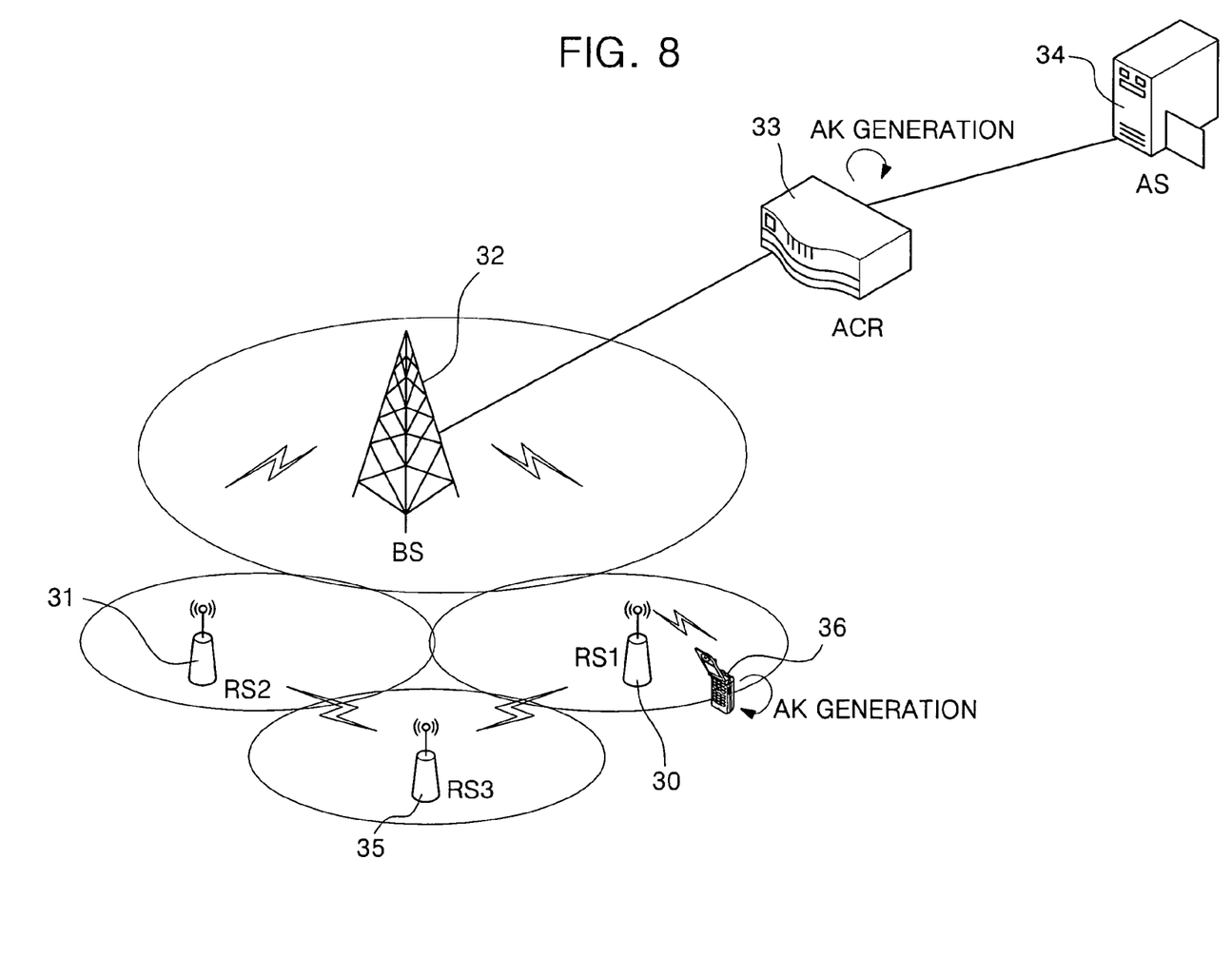
FIG. 8 illustrates a process flow of performing centralized authentication when a mobile station (MS) enters the network through a multi-hop node.

FIG. 8 illustrates a process flow of performing centralized authentication when a mobile station (MS) enters the network through a multi-hop node.

As shown in FIG. 8, a mobile station 36 sends an authentication request message to a multi-hop node 30 such that the mobile station 36 can be authenticated to join the multi-hop wireless network.

In response to the authentication request message sent from the mobile station 36 through the multi-hop node 30, an authentication server 34 authenticates the mobile station 36 to generate a pair-wise master key and then sends the pair-wise master key to the multi-hop node 30 and the mobile station 36 through an access control router 33 and a base station 32.

At this time, an available authentication algorithm can be one of an ID/password method, a shared secret based symmetric key algorithm, a public key based algorithm, and a challenge-response based algorithm.

The multi-hop node 30 and the mobile station 36 perform a distributed authentication procedure after mutually generating an authorization key AK using the pair-wise master key.

Then, the multi-hop node 30 and the mobile station 36 share a session key TEK after performing a mutual authentication procedure.

Figure 9:
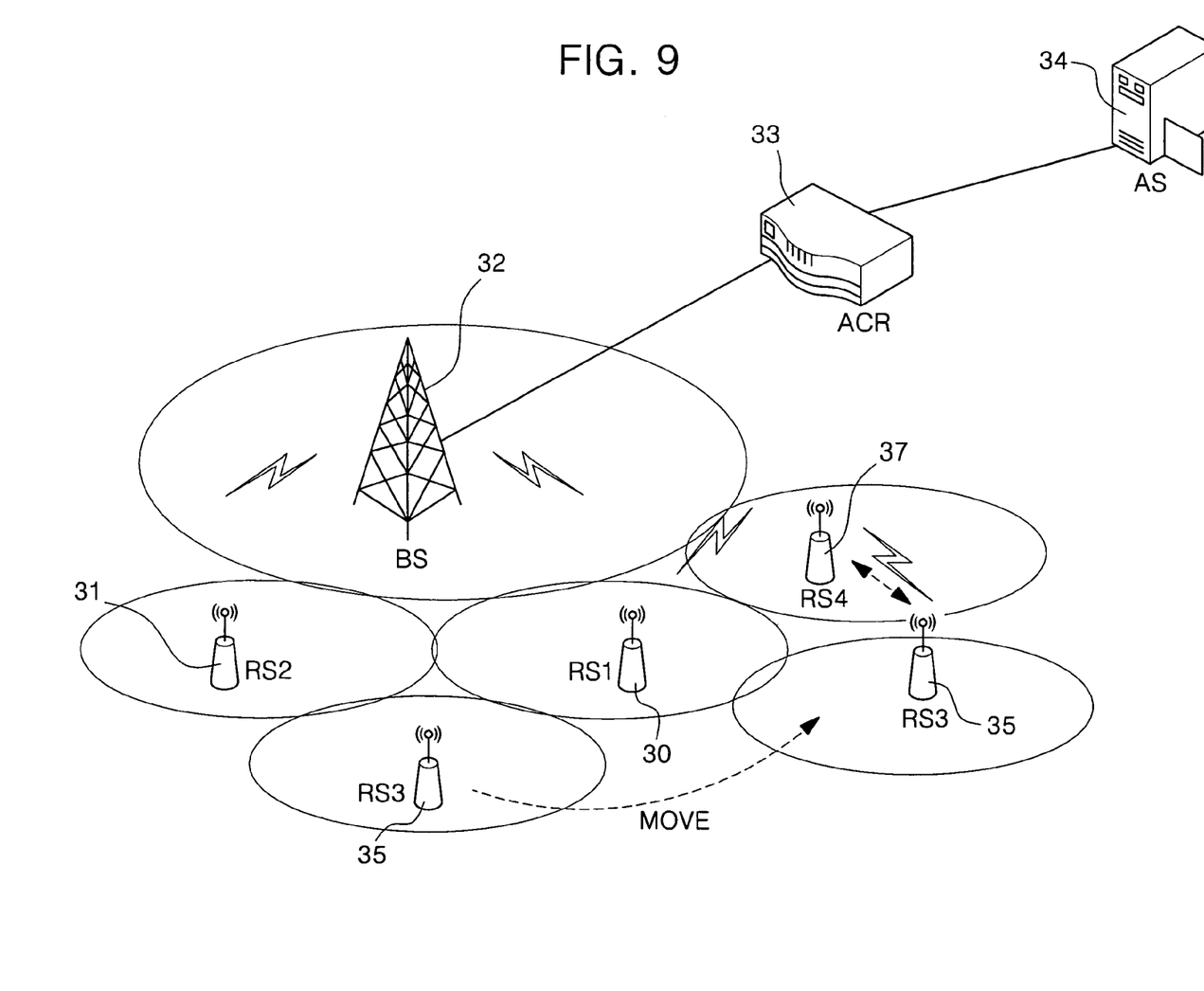
FIG. 9 illustrates a process flow of performing a handoff with another multi-hop node when a multi-hop node is on the move.

FIG. 9 illustrates a process flow of performing a handoff with another multi-hop node when a multi-hop node is on the move.

When a multi-hop node 35 moves and serves as a new neighbor of a multi-hop node 37 as shown in FIG. 9, a handoff should be performed after mutual authentication is completed such that opposite parties are mutually reliable.

At this time, the multi-hop node 37 requires an authorization key for the multi-hop node 35. Accordingly, the multi-hop node 37 sends an authorization key request for the multi-hop node 35 to neighbor nodes so as to acquire the authorization key for the multi-hop node 35.

This is because there is a high possibility that multi-hop nodes to which the multi-hop node has moved are the neighbor nodes of the multi-hop node 37.

To perform faster authentication, the multi-hop node 37 receives handoff information of the multi-hop node 35 from a connected neighbor node before the multi-hop node 35 moves to an area of the multi-hop node 37 and sends a transmission request for an authorization key required to authenticate the multi-hop node 35 to the neighbor nodes of the multi-hop node 37.

The neighbor node providing the handoff information of the multi-hop node 35 can encrypt the authorization key required to authenticate the multi-hop node 35 using a session key relating to the multi-hop node 35 and send the encrypted authorization key to the multi-hop node 37.

The multi-hop node 37 can quickly authenticate the multi-hop node 35 by securing the authorization key required to authenticate the multi-hop node 35 before a handoff for the multi-hop node 35.

As described above, a multi-hop wireless network system and an authentication method thereof in accordance with the invention can acquire a shared key required for hop-by-hop mutual authentication between multi-hop nodes using a centralized authentication scheme in the case of initial mutual authentication between the multi-hop nodes and a multi-hop wireless network and perform distributed authentication between the multi-hop nodes using the acquired shared key, thereby addressing a problem that it is difficult to share distributed authentication information in the case of a distributed authentication scheme. The reliability of first authentication can be improved by acquiring authentication information through an authentication server.

Since authentication between multi-hop nodes is performed, a multi-hop wireless network can be safely configured and routing information between the multi-hop nodes can be safely delivered.

In this case, authentication between the multi-hop nodes can be more quickly achieved in comparison with a centralized authentication scheme through the authentication server when the multi-hop nodes are on the move, that is, a handoff for the multi-hop nodes is performed.

While the invention has been shown and described in connection with the preferred embodiments, it will be apparent to those skilled in the art that modifications and variations can be made without departing from the spirit and scope of the invention as defined by the appended claims.

What is claimed is:

1. A multi-hop wireless network system comprising:
   an authentication server; and
   a multi-hop node configured to:
      generate an authentication request message to join a multi-hop wireless network,
      transmit the authentication request message to the authentication server through a base station, and
      generate a session key associated with the base station after generating an authorization key,
   wherein the authorization key is generated by the multi-hop node using a security key received from the authentication server in response to the authentication server receiving the authentication request message, and
   wherein the session key is utilized to encrypt traffic.

2. The multi-hop wireless network system according to claim 1, wherein the authentication server is configured to authenticate the multi-hop node using one of an identifier/password method, a shared secret based symmetric key algorithm, a public key based algorithm, and a challenge-response based algorithm in response to the authentication request message being received from the multi-hop node.

3. A multi-hop wireless network system comprising:
   a base station; and
   first and second multi-hop nodes located in a service area of the base station,
   wherein the first multi-hop node is configured to transmit an authentication request message to the second multi-hop node for mutual authentication with the second multi-hop node,
   wherein the second multi-hop node is configured to transmit to the first multi-hop node, an authorization key associated with the first multi-hop node included in an authorization key response message received from one of the base station and a neighbor multi-hop node after broadcasting an authorization key request message to the base station and the neighbor multi-hop node so as to acquire the authorization key associated with the first multi-hop node from the authorization key response message, and
   wherein the one of the base station and the neighbor multi-hop node is configured to transmit the authorization key response message, in which the authorization key associated with the first multi-hop node is encrypted, with a session key associated with the second multi-hop node.

4. The multi-hop wireless network system according to claim 3, wherein the first and second multi-hop nodes are configured to mutually generate a new authorization key by refreshing the authorization key associated with the first multi-hop node.

5. A multi-hop wireless network system comprising:
   an authentication server; and
   a multi-hop node configured to:
      transmit an authentication request message received from a mobile station to the authentication server through a base station so as to join a multi-hop wireless network, and
      generate a session key associated with the mobile station after generating an authorization key,
   wherein the authorization key is generated by the multi-hop node using a security key received from the authentication server in response to the authentication server receiving the authentication request message, and
   wherein the session key is utilized to encrypt traffic.

6. The multi-hop wireless network system according to claim 5, wherein the authentication server is configured to authenticate the multi-hop node using one of an identifier/password method, a shared secret based symmetric key algorithm, a public key based algorithm, and a challenge-response based algorithm in response to the authentication request message being received from the multi-hop node.

7. A multi-hop wireless network system comprising:
   first and second multi-hop nodes,
   wherein the first multi-hop node is configured to transmit a mutual authentication request to the second multi-hop node when a handoff to a service area of the second multi-hop node is performed,
   wherein the second multi-hop node is configured to transmit a request for an authorization key associated with the first multi-hop node to neighbor nodes of the second multi-hop node and perform mutual authentication using the authorization key associated with the first multi-hop node received from one of the neighbor nodes, and
   wherein the one of the neighbor nodes is configured to encrypt the authorization key using a session key associated with the second multi-hop node and transmit the encrypted authorization key to the second multi-hop node.

8. An authentication method for use in a multi-hop wireless network system having an authentication server and multi-hop nodes, the authentication method comprising:
   generating, by a multi-hop node, an authentication request message to join a multi-hop wireless network;
   transmitting, by the multi-hop node, the authentication request message to the authentication server through a base station;

generating, by the authentication server, a security key after authenticating the multi-hop node in a set algorithm in response to receiving the authentication request message;

transmitting, by the authentication server, the security key to the multi-hop node; and generating, by the multi-hop node, a session key associated with the base station after generating an authorization key, wherein the multi-hop node generates the authorization key using the security key received from the authentication server, and wherein the session key is utilized to encrypt traffic.

9. The authentication method according to claim 8, wherein the set algorithm is one of an identifier/password method, a shared secret based symmetric key algorithm, a public key based algorithm, and a challenge-response based algorithm.

10. An authentication method for use in a multi-hop wireless network system having a base station and first and second multi-hop nodes located in a service area of the base station, the authentication method comprising:

transmitting to the second multi-hop node, by the first multi-hop node, an authentication request message for mutual authentication with the second multi-hop node; and transmitting to the first multi-hop node, by the second multi-hop node, an authorization key associated with the first multi-hop node included in an authorization key response message received from one of the base station and the neighbor multi-hop nodes after broadcasting an authorization key request message to the base station and the neighbor multi-hop nodes so as to acquire the authorization key associated with the first multi-hop node from the authorization key response message, wherein transmitting the authorization key associated with the first multi-hop node to the first multi-hop node comprises:

transmitting, by the one of the base station and the neighbor multi-hop nodes, the authorization key response message, in which the authorization key of the first multi-hop node is encrypted, with a session key associated with the second multi-hop node.

11. The authentication method according to claim 10, further comprising:

mutually generating, by the first and second multi-hop nodes, a new authorization key by refreshing the authorization key associated with the first multi-hop node.

12. An authentication method for use in a multi-hop wireless network system having an authentication server and multi-hop nodes, the authentication method comprising:

transmitting, by a multi-hop node, an authentication request message received from a mobile station to the authentication server through a base station so as to join a multi-hop wireless network;

generating, by the authentication server, a security key to transmit the security key to the multi-hop node through the base station after authenticating the multi-hop node in a set algorithm in response to receiving the authentication request message; and generating, by the multi-hop node, a session key associated with the mobile station after generating an authorization key, wherein the multi-hop node generates the authorization key using the security key received from the authentication server, and wherein the session key is utilized to encrypt traffic.

13. The authentication method according to claim 12, wherein the set algorithm is one of an identifier/password method, a shared secret based symmetric key algorithm, a public key based algorithm, and a challenge-response based algorithm.

14. An authentication method for use in a multi-hop wireless network system, the authentication method comprising:

transmitting, by a first multi-hop node, a mutual authentication request to a second multi-hop node when a handoff to a service area of the second multi-hop node is performed;

transmitting, by a second multi-hop node, a request for an authorization key associated with the first multi-hop node to neighbor nodes of the second multi-hop node; and performing, by the second multi-hop node, mutual authentication using the authorization key associated with the first multi-hop node received from one of the neighbor nodes, wherein performing the mutual authentication using the authorization key for the first multi-hop node received from the one of the neighbor nodes of the second multi-hop node comprises:

encrypting, by the one of the neighbor nodes, the authorization key using a session key associated with the second multi-hop node to transmit the encrypted authorization key to the second multi-hop node.

* * * * *